United States Patent
Rust et al.

(10) Patent No.: US 11,964,711 B2
(45) Date of Patent: Apr. 23, 2024

(54) TRACK LINK IN TRACK LINK ASSEMBLY HAVING GUIDE PROTRUSION

(71) Applicant: Caterpillar Inc., Peoria, IL (US)

(72) Inventors: Craig Richard Rust, Edwards, IL (US); Allen Jay Weeks, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 265 days.

(21) Appl. No.: 17/386,846

(22) Filed: Jul. 28, 2021

(65) Prior Publication Data

US 2023/0033046 A1 Feb. 2, 2023

(51) Int. Cl.
*B62D 55/21* (2006.01)

(52) U.S. Cl.
CPC .................... *B62D 55/21* (2013.01)

(58) Field of Classification Search
CPC ...... B62D 55/20; B62D 55/205; B62D 55/21; B62D 55/213; B62D 55/215
See application file for complete search history.

(56) References Cited

U.S. PATENT DOCUMENTS

| | | | |
|---|---|---|---|
| 3,588,195 A * | 6/1971 | Furukawa | B62D 55/12 305/200 |
| 4,042,282 A | 8/1977 | Haslett et al. | |
| 5,201,171 A | 4/1993 | Anderton et al. | |
| 5,829,850 A | 11/1998 | Ketting et al. | |
| 5,887,958 A | 3/1999 | Bissi et al. | |
| 10,065,692 B2 | 9/2018 | Brooks et al. | |
| 10,800,469 B2 | 10/2020 | Galat | |
| 2001/0003895 A1 * | 6/2001 | Bedford | B21L 9/065 59/7 |
| 2003/0101711 A1 * | 6/2003 | Yamamoto | B62D 55/21 59/7 |
| 2014/0083782 A1 * | 3/2014 | Brewer | B62D 55/202 180/9.1 |
| 2016/0221619 A1 * | 8/2016 | Kita | B62D 55/21 |
| 2020/0324838 A1 * | 10/2020 | Calia | B62D 55/32 |
| 2021/0179211 A1 * | 6/2021 | Hakes | B62D 55/20 |
| 2022/0033018 A1 * | 2/2022 | Chiang | B62D 55/21 |

FOREIGN PATENT DOCUMENTS

| | | | | |
|---|---|---|---|---|
| EP | 0860352 | 8/1998 | | |
| WO | WO-2015079312 A1 * | 6/2015 | ......... | B62D 55/0887 |

* cited by examiner

*Primary Examiner* — S. Joseph Morano
*Assistant Examiner* — Emily G. Castonguay

(57) ABSTRACT

A track link for a ground-engaging track system includes a link body having a pin bore formed in a first link strap and a bushing bore formed in a second link strap. The link body includes, upon an outboard link side, a bore peripheral surface extending circumferentially around a bore center axis, and a guide protrusion including an outer bump surface located outboard of the bore peripheral surface. The pin bore receives a track pin attached by swaging and defines a diametric plane through the bore center axis oriented parallel to an upper rail surface. At least a majority of the outer bump surface is between the diametric plane and the upper rail surface, and an entirety of the outer bump surface may be between the bore center axis and the upper rail surface. The guide protrusion protects material of the track link and/or track pin from wear that can prevent re-swaging.

20 Claims, 4 Drawing Sheets

TRACK LINK IN TRACK LINK ASSEMBLY HAVING GUIDE PROTRUSION

TECHNICAL FIELD

The present disclosure relates generally to a track link for a ground-engaging track system, and more particularly to a track link including a guide protrusion limiting wear of track components having a swaged connection.

BACKGROUND

Ground-engaging track systems are used in a great variety of different machines throughout the world. The utility of tracks for machinery propulsion and maneuvering in off-highway environments can hardly be overstated. Example machine applications include track-type tractors, track-type loaders, pipelayers, excavators, mining machines, and many others.

In a typical configuration, a track includes track links coupled end-to-end to form parallel track chains attached by track pins and forming an endless loop about rotatable track-engaging elements. Typical track systems can be subjected to extremely harsh conditions, travelling over hard, slippery, steep, and uneven terrain whilst bearing the weight of the associated machine and pushed, pulled, or carried loads. Due to the demanding nature of such field service conditions, track system components are typically built quite robustly and require regular inspection, maintenance, and servicing.

It is also desirable in most track systems to provide robust and reliable connections between components in the track itself. It has been observed for many years that joints between track components, including rotatable pivot joints and non-rotating connections can sometimes degrade in performance, leak lubricating fluid, or even fail in the field. Engineers have proposed a great many different strategies for connecting track links, track pins, and various other components to one another. In some instances, techniques known generally as positive pin retention are used where track pins and/or track links are provided with purpose-built features or equipped with additional retention components to enhance the strength and durability of the connections.

U.S. Pat. No. 5,201,171 to Anderton is directed to a method and apparatus for retaining a track chain joint. Anderton proposes a joint including a pair of links and a cylindrical pin, where each link includes a laterally outwardly offset end collar having a boss and a bore therethrough. An arcuately shaped annular groove is formed about each end portion of the pin, and a punch device is placed against the outer periphery of the boss in radial alignment with the groove. Force is applied on the punch device to form at least one mechanically formed nodule protruding from the outboard end collars into a respective one of the grooves.

Positive pin retention strategies and the like have seen commercial success. At least some of these techniques, however, modify the track components such that once the track is disassembled for servicing the components are difficult or impractical to re-use, or must be reassembled and retained in a different way or by special processes. In-service wear phenomena can also sometimes increase the difficulties encountered in re-using various track system components.

SUMMARY

In one aspect, a track link for a ground-engaging track system includes a link body having a first link strap, a second link strap, a center section longitudinally between the first link strap and the second link strap, an upper rail surface, and a lower shoe-bolting surface. The first link strap has a pin bore formed therein defining a bore center axis, and extending between an inboard link side and an outboard link side, and the second link strap having a second bore formed therein and extending between the inboard link side and the outboard link side. The link body further includes, upon the outboard link side, a bore peripheral surface extending circumferentially around the bore center axis, and a guide protrusion adjacent to the bore peripheral surface and including an outer bump surface located outboard of the bore peripheral surface. The pin bore defining a diametric plane through the bore center axis oriented parallel to the upper rail surface, and at least a majority of the outer bump surface is between the diametric plane and the upper rail surface.

In another aspect, a track link assembly includes a track link having an upper rail surface and a lower shoe-bolting surface each extending fore-to-aft between a bushing bore and a pin bore defining a bore center axis and extending through the track link between an inboard link side and an outboard link side, and a bore peripheral surface extending circumferentially around the bore center axis. The track link assembly further includes a track pin swaged to the track link within the pin bore, and the track link further including a guide protrusion upon the outboard side, the guide protrusion including an outer bump surface that is located outboard of the bore peripheral surface, forward of the pin bore, and in entirety between the bore center axis and the upper rail surface.

In still another aspect, a track link for a ground-engaging track system includes a link body having a first link strap, a second link strap, a center section longitudinally between the first link strap and the second link strap, an upper rail surface, and a lower shoe-mounting surface. The first link strap has a pin bore formed therein defining a bore center axis, and a bore peripheral surface having an outer perimetric edge, and the second link strap having a second bore formed therein. The link body further including a guide protrusion located radially outward of the outer perimetric edge, and including an outer bump surface. The bore peripheral surface has a full circumferential extent and a first radial extent, relative to the bore center axis, and the outer bump surface having a partial circumferential extent and a second radial extent, relative to the bore center axis, and the second radial extent is greater than the first radial extent.

DETAILED DESCRIPTION

Figure 1:
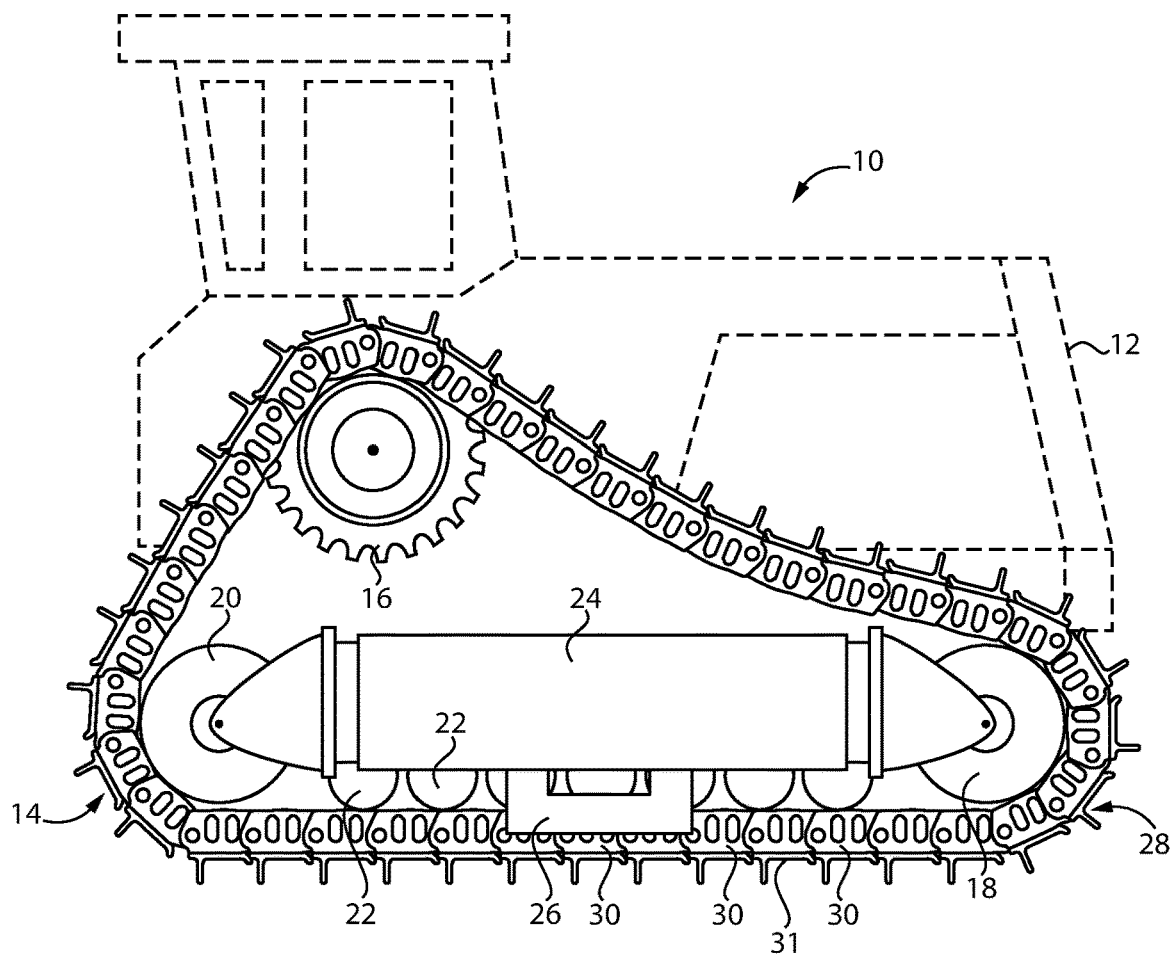
FIG. 1 is a side diagrammatic view of a machine, according to one embodiment.

Referring to FIG. 1, there is shown a track-type machine 10, according to one embodiment. Machine 10 includes a machine frame 12 and a ground-engaging track system 14 supporting machine frame 12. Machine 10 will typically include components similar or identical to those depicted in the side view of FIG. 1 upon an opposite side of machine frame 12 not visible in FIG. 1. Track system 14 includes a drive sprocket 16, a front idler 18, a back idler 20, a plurality of track rollers, a track roller frame 24, and a track 28. Track rollers 22 support at least a majority of a weight of machine 10, with each of front idler 18 and back idler 20 rotating passively in contact with track 28 as drive sprocket 16 is rotated to advance track 28 in an endless loop around the various rotatable elements. Track system 14 is shown in a so-called "high drive" configuration. In other embodiments track system 14 could have an oval track configuration, or still another. Track 28 includes a plurality of coupled together track links 30 forming two parallel track chains, one of which is visible in FIG. 1. Track shoes 31 are attached to each of track links 30 in the illustrated embodiment. Machine 10 could include a track-type tractor as shown, but in other embodiments could be a track-type loader, a mining machine, or various others.

Figure 2:
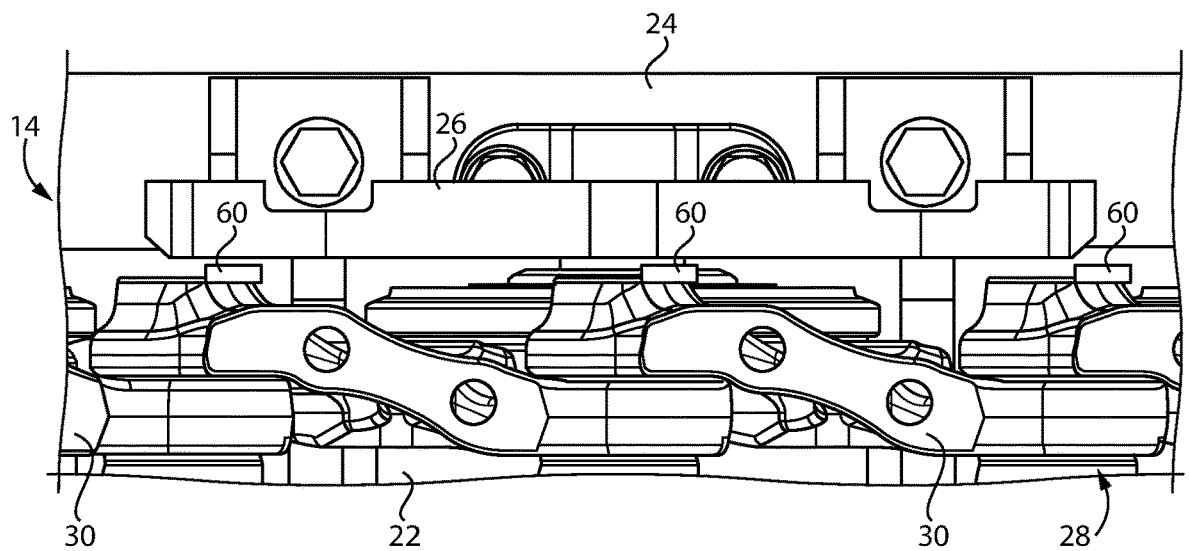
FIG. 2 is a diagrammatic view of a portion of a ground-engaging track system, according to one embodiment.

Track system 14 further includes a track guide 26 attached to and downwardly depending from track roller frame 24. Referring also now to FIG. 2, during operation track 28 is advanced in contact with track rollers 22 past track guide 26. Track rollers 22 are shown in the illustrated embodiment to ride upon track rails formed by the two parallel track chains. Under field service conditions track 28 and/or machine 10 more generally can be subjected to a variety of types of loading, including loads imparting a tendency for track 28 to be deflected laterally and potentially out of contact with track rollers 26. Track guide 26 can assist in preventing lateral displacement of track 28 that could cause derailing. In the illustrated embodiment one track guide is shown. Embodiments can include multiple track guides on each lateral side of track 28, only one track guide, one on each side and/or track guides associated with rotatable elements other than track rollers 26, in any suitable arrangement. When track 28 is urged into contact with track guide 26 parts of track 28 can contact track guide 26 with the result being wearing away of material of track 28. As will be further apparent from the following description, track 28, and track links 30 in particular, are uniquely configured to prevent damage or performance degradation that can result from the wearing away of material by contact between track 28 and track guide 26, as well as ensuring optimal prospects for re-use and reassembly of track 28 after servicing or repair.

Figure 3:
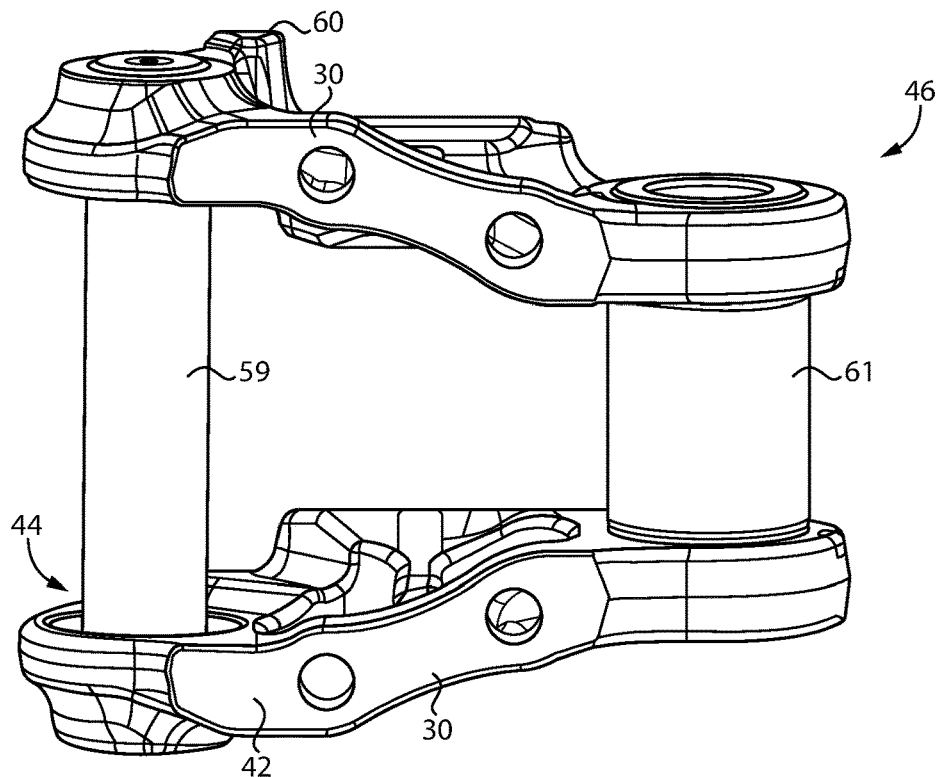
FIG. 3 is a diagrammatic view of a track joint assembly, according to one embodiment.
Figure 4:
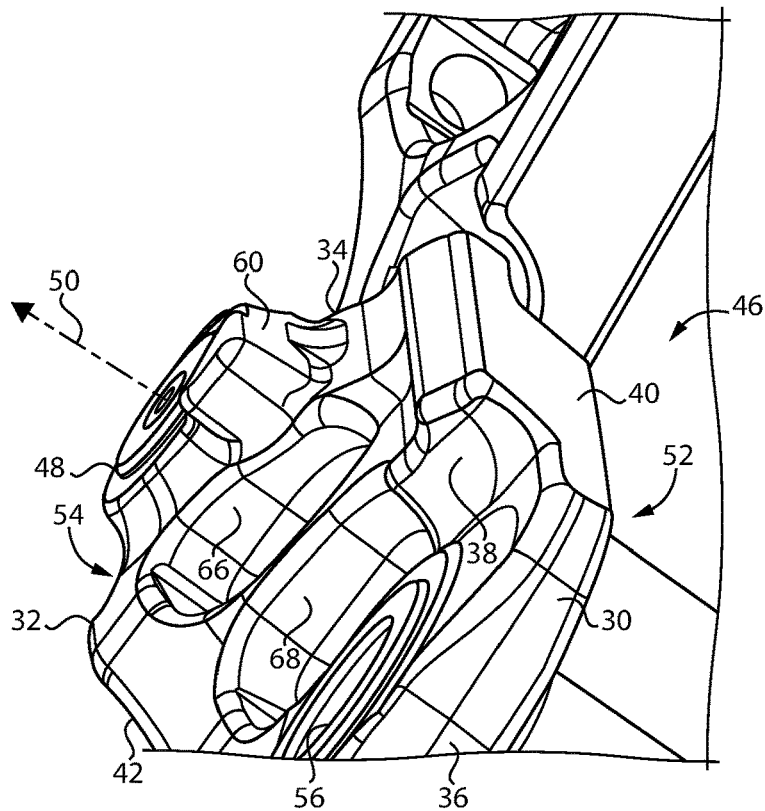
FIG. 4 is another diagrammatic view of a track joint assembly, according to one embodiment.

Referring also now to FIG. 3, there is shown a track joint assembly 46 including two track links 30, a track pin 59, and a bushing 61. When assembled for service in track 28 an additional bushing will typically be positioned about track pin 59 and an additional track pin will be positioned through bushing 61. It can be seen from FIG. 3 that track links 30 have an offset or S-shaped configuration, such that one end of each track link 30 is laterally offset from the opposite respective end. In other arrangements, straight links could be used. It can also be seen that one of track links 30 can be understood as left-handed and the other as right-handed, in the illustrated embodiment. Track joint assembly 46 further includes a track link assembly 44 formed by track pin 59 and one or both of track links 30. Track links according to the present disclosure may be provided commercially as an individual link, in a track joint assembly, in a track link assembly, in a partially or fully constructed track, such as in a rolled-up configuration, or on a fully built machine.

Referring also now to FIGS. 4-7, track links 30, hereinafter referred to at times in the singular, each include a link body 32 having a back or first link strap 34, a forward or second link strap 36, a center section 38 longitudinally between first link strap 34 and second link strap 36, an upper rail surface 40, and a lower shoe-bolting surface 42. First link strap 34 includes a pin bore 48 formed therein defining a bore center axis 50, and extending between an inboard link side 52 and an outboard link side 54. As used herein the term "outboard" refers to a side or a direction oriented away from a longitudinal centerline of track 28, whereas the term "inboard" means toward a longitudinal centerline of track 28. Second link strap 36 includes a second bore or bushing bore 56 formed therein and extending between inboard link side 52 and outboard link side 54. Bushing bore 56 may be larger in diameter than pin bore 48. Track link 30 and link body 32, terms used interchangeably herein, may be elongate and each of upper rail surface 40 and lower shoe-bolting surface 42 may extend fore-to-aft between second link strap 36 and first link strap 34 and fore-to-aft between bushing bore 56 and pin bore 48. A first nut seat window 66 and a second nut seat window 68 may be formed longitudinally between pin bore 48 and bushing bore 56 and arranged to receive nuts attached to bolts bolting a track shoe 31 to track link 30.

Link body 32 further includes, upon outboard link side 54, a bore peripheral surface 58 extending circumferentially around bore center axis 50. Link body 32 further includes, upon outboard link side 54, a guide protrusion 60 adjacent to bore peripheral surface 58 and projecting in an outboard direction from link body 32. Guide protrusion 60 includes an outer bump surface 62 located outboard of bore peripheral surface 58 and structured to contact track guide 26, at times, to maintain track 28 in a desired travel path relative to other track system components during operation. Outer bump surface 62 is thus understood to be spaced laterally outward of bore peripheral surface 58, the significance of which will be further apparent from the following description. Nut seat window 66 may be formed adjacent to pin bore 48, with guide protrusion 60 being located longitudinally between pin bore 48 and nut seat window 66 in some embodiments.

Figure 5:
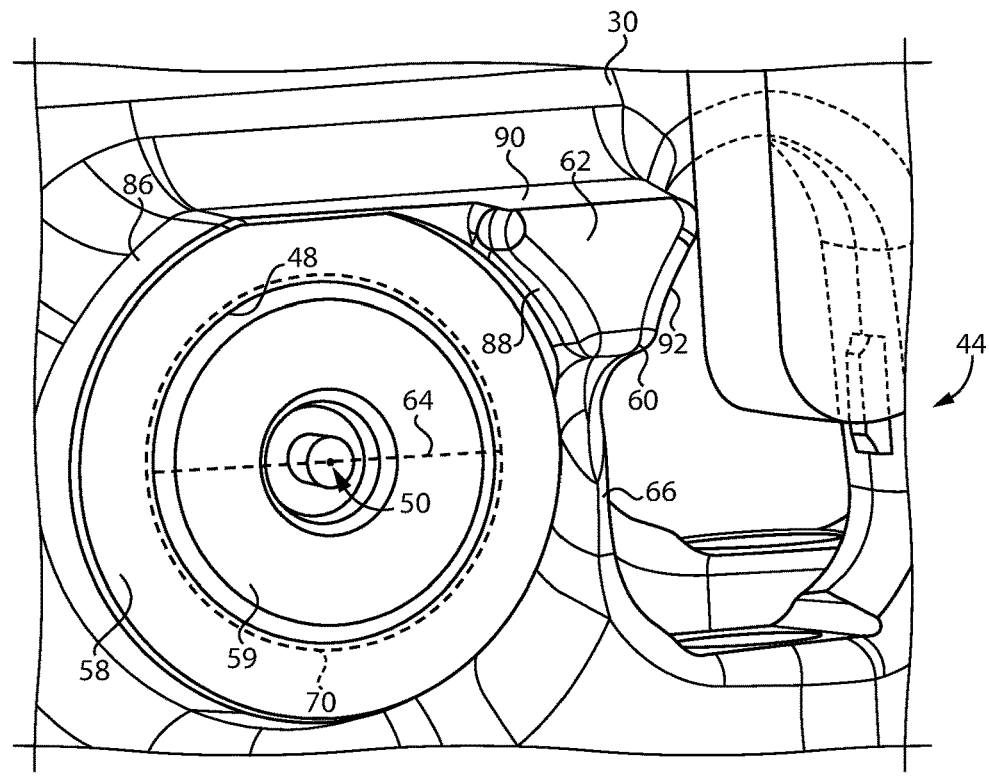
FIG. 5 is a diagrammatic view of portions of a track link assembly, according to one embodiment.

Focusing now on FIG. 5, pin bore 48 defines a diametric plane 64 through bore center axis 50 oriented parallel to upper rail surface 40. At least a majority of outer bump surface 62, meaning a majority of a surface area of outer bump surface 62, may be between diametric plane 64 and upper rail surface 40. In some embodiments, track link 30 includes a total of one guide protrusion 60, and an entirety of the total of the one guide protrusion 60 and an entirety of outer bump surface 62 is between diametric plane 64 and upper rail surface 40. Outer bump surface 62 may further be understood to be located forward of pin bore 48, and in some embodiments in entirety between bore center axis 50 and upper rail surface 40.

Figure 6:
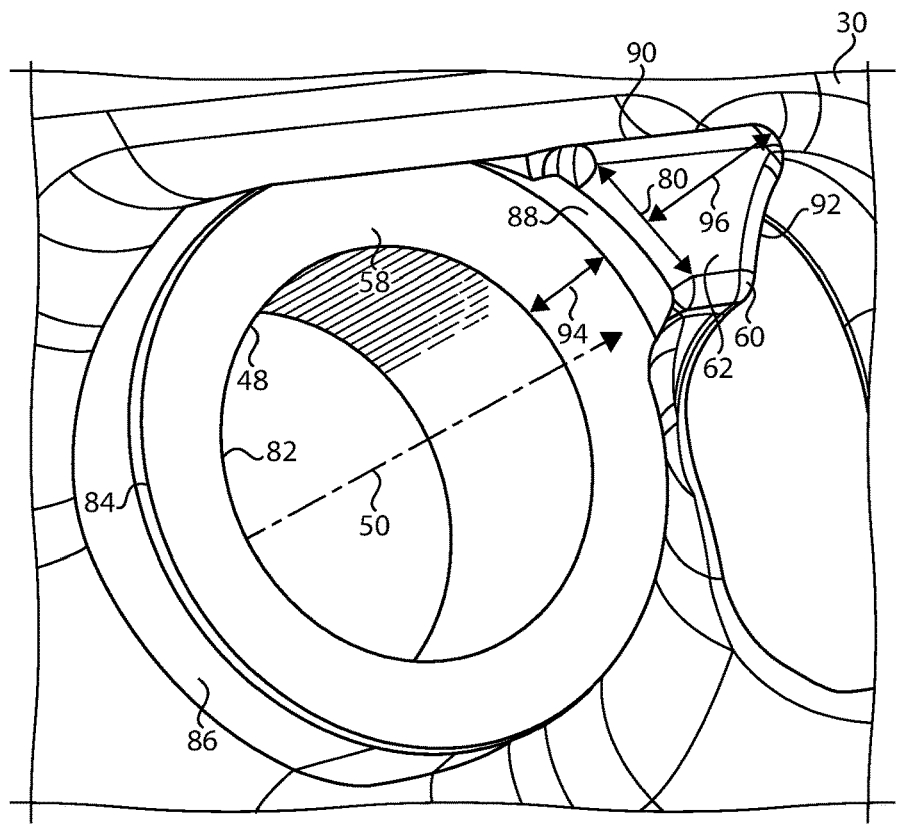
FIG. 6 is a diagrammatic view of a portion of a track link, according to one embodiment.

With focus now on FIG. 6, bore peripheral surface 58 may include an inner perimetric edge 82 and an outer perimetric edge 84. Guide protrusion 60 may be radially outward in its entirety, of outer perimetric edge 84. Track link 30 may further include a link pin boss 86, and pin bore 48 may open in link pin boss 86. Guide protrusion 60 may be connected to link pin boss 86. In the illustrated embodiment, bore peripheral surface 58 is upon link pin boss 86 and is uniformly planar. In some embodiments guide protrusion 60 may have a circumferential extent 80 (a "partial circumferential extent") that is less than 90° circumferentially around bore center axis 50. Guide protrusion 60 may further include an inside surface 88 having a curvilinear profile defining an arc segment of a circle extending around and typically centered on bore center axis 50, and an upper protrusion surface 90 having a linear profile defining a line segment oriented parallel to upper rail surface 40.

Figure 7:
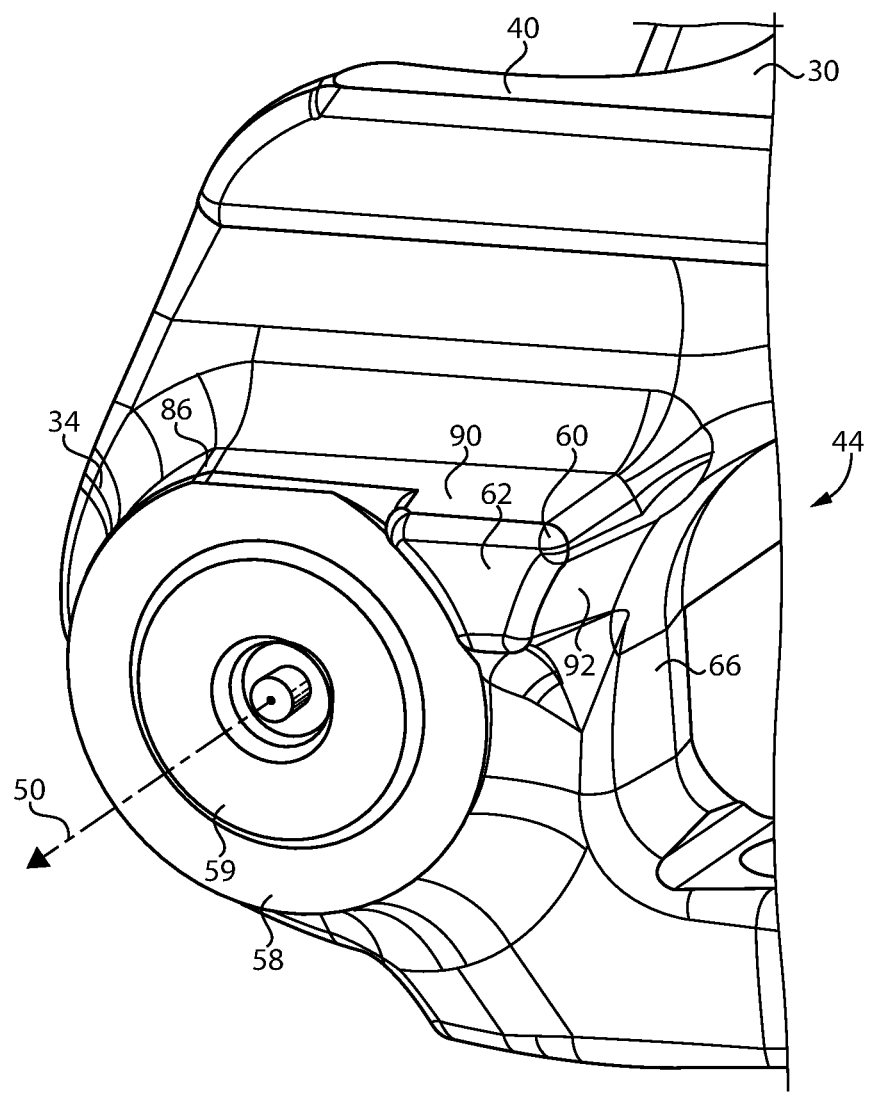
FIG. 7 is another diagrammatic view of a track link assembly, according to one embodiment.

It can be noted from FIG. 7 that outside surface 92 can smoothly transition to surfaces of link body 31 forming nut seat window 66. As also depicted in the drawings inside surface 88 and outside surface 92 may be oriented convergently in a downward direction from upper protrusion surface 90. In a side view guide protrusion 60 can be understood to have a wedge shape, with rounded transitions from outer bump surface 62 to the respective inside surface 88, upper protrusion surface 90, and outside surface 92. At least a portion of outer bump surface 62 may be planar and oriented parallel to bore peripheral surface 58.

Also depicted in FIG. 6 are some example relative proportions of bore peripheral surface 58 and outer bump surface 62. Bore peripheral surface 58 may have a full circumferential extent circumferentially around bore center axis 50. The full circumferential extent can be understood to be 360° circumferentially around bore center axis 50. Bore peripheral surface 58 can also be understood to have a first radial extent 94, relative to bore center axis 50. Outer bump surface 62 may have a partial circumferential extent as noted, which may be less than 90° circumferentially around bore center axis 50, and in refinements less than 60°, less than 45°, or smaller still. Second radial extent 96 can be greater than first radial extent 96 in some embodiments. Put differently, at locations aligned with a common radius extending through bore center axis 50, bore peripheral surface 58 may be narrower in a radial direction than outer bump surface 62.

INDUSTRIAL APPLICABILITY

Referring to the drawings generally, it will be recalled that a variety of different strategies have been proposed over the years for positively retaining track pins to track links. During service, various load conditions and in some instances wear can cause a track pin and track link joint to weaken, fail, or the components gradually begin to "walk" apart. One technique that has been established to successfully secure connections between a track pin and a track link is swaging. As illustratively shown in FIG. 5, where a swaging technique is used swaged pin material 70 can be displaced outwardly into a volume defined by track link 30, typically into a groove formed in track link 30. FIG. 5 depicts swaged pin material 70 around a full circumference of pin 59. In many instances a first swaging connection when the track is first placed in service could cause material to be displaced at a first group of circumferential locations, while a subsequent swaging connection when the track is reassembled could cause material to be displaced at locations circumferentially offset from the locations of the first swaging.

It has been discovered that wear between a track guide and the ends of track pins or link bosses in close proximity to track pins can interfere with the swaging connection. The wear process can also disturb the bore peripheral surface in a way that can make swaging a track pin to track link connection a second time challenging or impossible. It is generally desirable to adjust bushings in a track over the course of a track's field service life. To perform the bushing rotation or other adjustment it is necessary to reverse swaged connections and disassemble the track. According to the present disclosure, when track 28 is operated and contacts track guide 26, or such other track guides as might be used, guide protrusion 60 will tend to contact track guide 26 and thereby prevent contact of bore peripheral surface 58 and/or track pin 59 to track guide 26, thereby protecting the swaged connection. Moreover, by positioning guide protrusion 60 as disclosed herein bore peripheral surface 58 can maintain its planar geometry and dimensions, and thus capacity for optimum re-swaging.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track link for a ground-engaging track system comprising:
   a link body including a first link strap, a second link strap, a center section longitudinally between the first link strap and the second link strap, an upper rail surface, and a lower shoe-bolting surface;
   the first link strap having a pin bore formed therein defining a bore center axis, and extending between an inboard link side and an outboard link side, and the second link strap having a second bore formed therein and extending between the inboard link side and the outboard link side;
   the link body further including, upon the outboard link side, a bore peripheral surface extending circumferentially around the bore center axis and radially outward from the pin bore, and a guide protrusion adjacent to the bore peripheral surface and including an outer bump surface located outboard of the bore peripheral surface; and
   the pin bore defining a diametric plane through the bore center axis oriented parallel to the upper rail surface, and at least a majority of the outer bump surface is between the diametric plane and the upper rail surface.

2. The track link of claim 1 wherein a nut seat window is formed adjacent to the pin bore, and the guide protrusion is longitudinally between the pin bore and the nut seat window.

3. The track link of claim 2 wherein the track link includes a total of one guide protrusion, and an entirety of the total of the one guide protrusion is between the diametric plane and the upper rail surface.

4. The track link of claim 1 wherein the guide protrusion has a circumferential extent that is less than 90° circumferentially around the bore center axis.

5. The track link of claim 4 wherein the bore peripheral surface includes an inner perimetric edge and an outer perimetric edge, and the guide protrusion is radially outward of the outer perimetric edge.

6. The track link of claim 4 wherein:
   the track link further includes a link pin boss, and the pin bore opens in the link pin boss; and
   the bore peripheral surface is upon the link pin boss and is uniformly planar.

7. The track link of claim 6 wherein at least a portion of the outer bump surface is planar and oriented parallel to the bore peripheral surface.

8. The track link of claim 6 wherein the guide protrusion includes an inside surface having a curvilinear profile defining an arc segment of a circle extending around the bore center axis, and an upper protrusion surface having a linear profile defining a line segment oriented parallel to the upper rail surface.

9. The track link of claim 8 wherein the guide protrusion includes an outside surface, and the inside surface and the outside surface are oriented convergently in a downward direction from the upper protrusion surface.

10. A track link assembly comprising:
a track link including an upper rail surface and a lower shoe-bolting surface each extending fore-to-aft between a bushing bore and a pin bore defining a bore center axis and through the track link between an inboard link side and an outboard link side, and a bore peripheral surface extending circumferentially around the bore center axis and radially outward from the pin bore;
a track pin swaged to the track link within the pin bore; and
the track link further including a guide protrusion upon the outboard side, the guide protrusion including an outer bump surface that is located outboard of the bore peripheral surface, forward of the pin bore, and in entirety between the bore center axis and the upper rail surface.

11. The track link assembly of claim 10 wherein the guide protrusion has a circumferential extent that is less than 90° circumferentially around the bore center axis.

12. The track link assembly of claim 11 wherein the circumferential extent is less than 60° circumferentially around the bore center axis.

13. The track link assembly of claim 11 wherein the guide protrusion includes an inside surface having a curvilinear profile extending around the bore center axis.

14. The track link assembly of claim 10 wherein the bore peripheral surface is uniformly planar and includes an inner perimetric edge and an outer perimetric edge, and the guide protrusion is radially outward of the outer perimetric edge.

15. The track link assembly of claim 14 wherein the track link further includes a link pin boss having the bore peripheral surface formed thereon, and wherein the guide protrusion is connected to the link pin boss.

16. A track link for a ground-engaging track system comprising:
a link body including a first link strap, a second link strap, a center section longitudinally between the first link strap and the second link strap, an upper rail surface, and a lower shoe-bolting surface;
the first link strap having a pin bore formed therein defining a bore center axis, and a bore peripheral surface extending radially outward from the pin bore and having an outer perimetric edge, and the second link strap having a second bore formed therein;
the link body further including a guide protrusion located radially outward of the outer perimetric edge, and the guide protrusion protruding in an outboard direction relative to the bore peripheral surface and including an outer bump surface; and
the bore peripheral surface having a full circumferential extent and a first radial extent, relative to the bore center axis, and the outer bump surface having a partial circumferential extent and a second radial extent, relative to the bore center axis, and the second radial extent is greater than the first radial extent.

17. The track link of claim 16 wherein the pin bore defines a diametric plane extending through the bore center axis, and the outer bump surface is located between the diametric plane and the upper rail surface.

18. The track link of claim 17 wherein the partial circumferential extent is less than 90° circumferentially around the bore center axis.

19. The track link of claim 16 wherein the guide protrusion has an inside surface having a curvilinear profile defining an arc segment of a circle extending around the bore center axis, and an outside surface.

20. The track link of claim 19 wherein:
the guide protrusion includes an upper protrusion surface having a linear profile defining a line segment oriented parallel to the upper rail surface; and
the inside surface and the outside surface are oriented convergently in a downward direction from the upper protrusion surface.

* * * * *